United States Patent
Huomo et al.

(10) Patent No.: US 6,912,384 B2
(45) Date of Patent: Jun. 28, 2005

(54) METHOD AND SYSTEM FOR TRANSFERRING A CELLULAR PHONE CALL

(75) Inventors: Miikka Huomo, Vantaa (FI); Juha Kallio, Helsinki (FI)

(73) Assignee: Nokia Corporation, Espoo (FI)

( * ) Notice: Subject to any disclaimer, the term of this patent is extended or adjusted under 35 U.S.C. 154(b) by 649 days.

(21) Appl. No.: 09/916,001

(22) Filed: Jul. 26, 2001

(65) Prior Publication Data

US 2003/0022671 A1 Jan. 30, 2003

(51) Int. Cl.$^7$ ................................................. H04M 3/42
(52) U.S. Cl. ....................... 455/417; 455/445; 455/437; 455/343.1
(58) Field of Search ................................ 455/445, 428, 455/560, 417, 437, 436, 438, 439, 442, 414.1, 416, 413, 421, 517, 518, 500, 343.1, 343.5, 574, 461, 572; 370/216, 221, 351; 379/142.07, 322–324, 413; 320/136, 134

(56) References Cited

U.S. PATENT DOCUMENTS

| 5,566,236 | A | * | 10/1996 | MeLampy et al. | ........... 455/560 |
| 5,862,208 | A | * | 1/1999 | MeLampy et al. | ........... 455/436 |
| 6,044,249 | A | | 3/2000 | Chandra et al. | ............... 455/62 |
| 6,192,245 | B1 | | 2/2001 | Jones et al. | ................. 455/437 |
| 6,385,469 | B1 | * | 5/2002 | Alperovich et al. | ........ 455/560 |
| 6,445,917 | B1 | | 9/2002 | Bark et al. | ................... 455/423 |

FOREIGN PATENT DOCUMENTS

JP          07217213          3/1997

* cited by examiner

Primary Examiner—Lester G. Kincaid
Assistant Examiner—Eliseo Ramos-Feliciano
(74) Attorney, Agent, or Firm—Cohen, Pontani, Lieberman & Pavane

(57) ABSTRACT

A method and system for automatically switching cellular telephone calls, in which a cellular telephone monitors the level of its battery power, and when the battery power level dips below a predetermined threshold, the cellular telephone sends a signal to a mobile switching center, which will automatically transfer the call to an alternate phone to continue the call or leave a message. The same system could be used to transfer the call if the cellular telephone goes out of service, for example by leaving the service area, hitting a "dead zone" of service, or having a technical problem with the equipment, but in these circumstances, the signal for initiating the transfer will originate with the mobile switching center, since the cellular telephone will not be in position to send further instructions. If the cellular telephone user has a replacement battery, the system could be set to first attempt to return the call to the original cellular telephone after a predetermined delay period, so that the call is not lost, and, if unsuccessful, then to a secondary number for either continuation of the call or taking a voice message from the sender if the mobile user is not near the alternate phone.

35 Claims, 2 Drawing Sheets

METHOD AND SYSTEM FOR TRANSFERRING A CELLULAR PHONE CALL

BACKGROUND OF THE INVENTION

1. Field of the Invention

The present invention is directed to a method and system for automatically forwarding wireless electronic communications from a mobile terminal (such as a mobile telephone, wireless modem, etc.) to a predetermined alternate terminal (land line or other mobile terminal) just before the mobile terminal's battery runs down or when service is temporarily interrupted, as when the user goes into a tunnel.

2. Description of the Related Art

Cellular telephone communications has become an integral part of the everyday life of many people, with usage growing by the minute. As more and more people spend more and more time using cellular phones, new problems are recognized. One such problem relates to battery failure in cellular telephones.

Most users regularly charge their batteries, and monitor the power level of the battery, so that they are not caught unawares by unexpected loss of battery power. Some users, however, either through heavy use, neglect, or equipment failure, may be faced with an unanticipated battery power failure. In the normal course of affairs, a battery failure would simply disconnect the call, and the other party to the call would simply be left with a dead line.

It would be useful if the connection to the other party could be salvaged, and either re-instated if the mobile user could switch batteries, or re-routed to a different number where the second user could finish the telephone call by leaving a message or talking to the same person at a different number, or even talking to a different person if desired.

Switching of cellular telephone calls is well known and the subject of industry standards. This switching, however, is generally restricted to the switching necessary to continue a call when it moves among different cells within a cellular network rather than when there is a disconnect. Such switching is disclosed in Japanese Patent Publication No. 09-064985.

This conventional switching presupposes that the cellular telephone is still capable of making a connection, which is not the case where its battery has run down.

SUMMARY OF THE INVENTION

It is therefore an object of the invention to provide a method and system for transferring a cellular telephone call to a different number when the power level of the battery of the cellular telephone is close to empty.

It is a further object of the invention to provide a method and system for automatically placing a cellular telephone call on hold when the battery is about to run out of power, thereby giving the cellular telephone user the opportunity to change batteries, and then have the call re-connected.

It is a still further object of the invention to provide a method and system for automatically re-routing a cellular telephone call to a third party number when the original connection is lost under certain conditions.

A mobile phone which utilizes the inventive method and system monitors the level of its battery power. When the battery power level dips below a predetermined threshold, the cellular telephone sends a signal to a mobile switching center, which automatically transfers the call to an alternate phone to continue the call or leave a message. The same system could be used to transfer the call if the cellular telephone goes out of service, for example, by leaving the service area, hitting a "dead zone" of service, or having a technical problem with the equipment, but in these circumstances, the signal for initiating the transfer originates with the mobile switching center, since the cellular telephone will not be in position to send further instructions.

If the cellular telephone user has a replacement battery, the system could be set first to attempt to return the call to the original cellular telephone after a predetermined delay period, so that the call is not lost, and, if unsuccessful, then transfer the call to a secondary number for either continuation of the call or taking a voice message from the sender if the mobile user is not near the alternate phone. The system may also attempt to re-establish the connection automatically once a new battery is installed.

The invention may be used with any device suitable for wireless and/or mobile communication, such as, for example, laptop computers with wireless modems, personal digital assistants (PDAs), or wireless internet appliances, and for any form of electronic communication besides telephone, such as internet browsing, e-mail, chats, video conferencing and the like.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
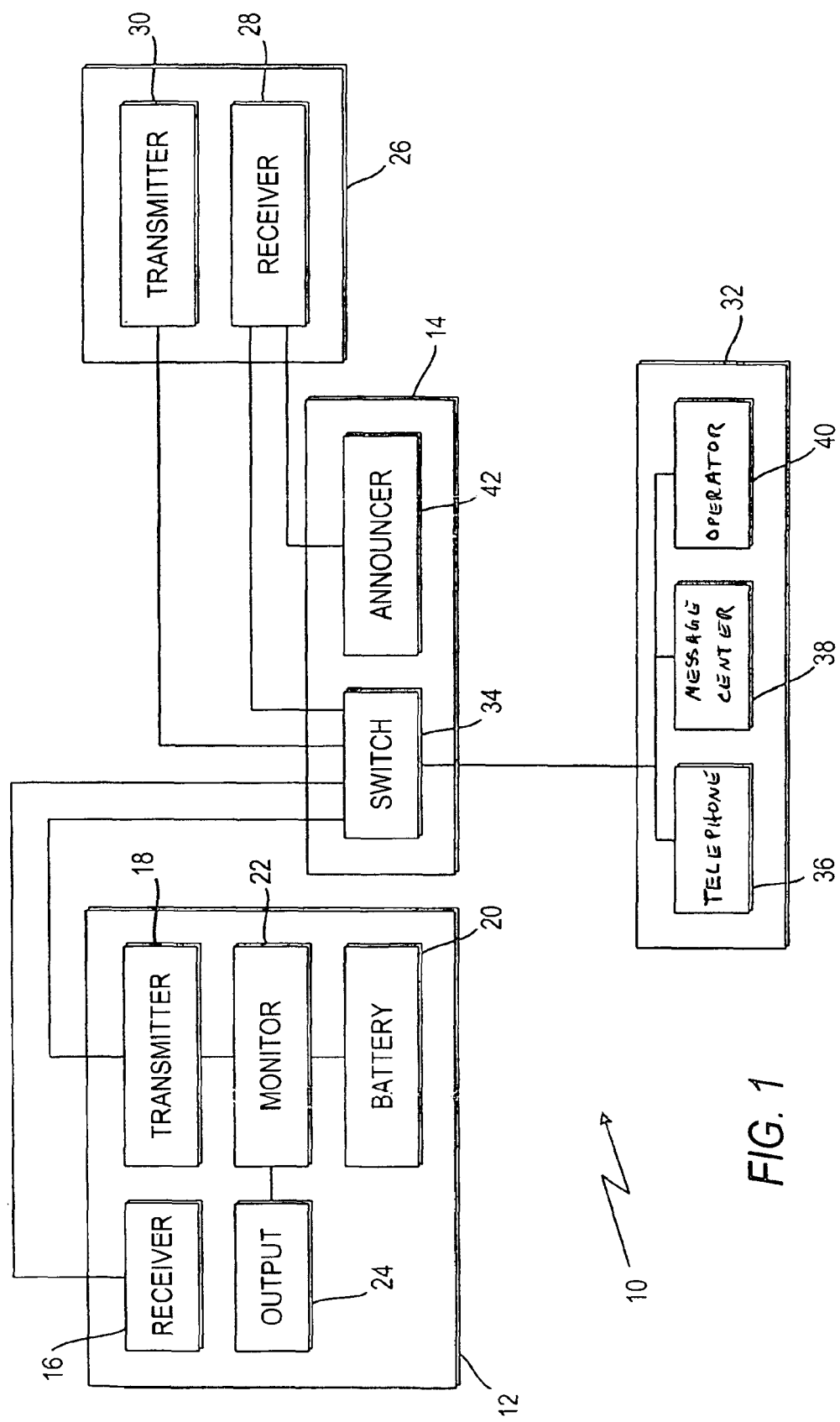
FIG. 1 is a schematic representation of a preferred embodiment of a mobile telephone communications system employing the present invention.

FIG. 1 depicts a cellular telephone system 10 in accordance with the present invention. System 10 includes a mobile terminal, such as, for example cellular telephone 12, which both receives and transmits telephone communications through a mobile switching center 14, in known fashion. Although a cellular telephone is the preferred embodiment, the inventive method and system could be as easily used with any other form of wireless electronic communication, such as a laptop computer with a wireless modem, a personal digital assistant (PDA) with wireless communication capabilities, etc.

Cellular telephone 12 comprises a receiver 16, a transmitter 18, a battery 20, a battery monitor 22 and an output 24. Output 24 could be any means for conveying information to the user of cellular telephone 12, such as a visual display (either a dedicated display or the cell phone's display), a light emitting device (such as an LED), or an audio generator (either a dedicated speaker or the cell phone's speaker). Battery monitor 22 is coupled to monitor the power level of battery 20. When the power level of battery 20 dips below a predetermined level, which is set just higher than the level necessary to sustain a connection by mobile phone 12 to mobile switching center 14, battery monitor 22 sends a signal to output 24. That signal informs the user of the low battery power level.

Output 24 could be of any desired kind to announce to the user that the battery is running low. For example, cellular telephone 12 could have audio (or even video) clips stored in memory to announce to the user that the battery is low, and she should immediately switch to a new battery, find some other power (e.g. an AC outlet for attaching a power cord), quickly terminate the call, or otherwise elect how to proceed in preference to the pre-selected hierarchy of options (discussed below). These clips could be downloaded from the network database to account for change in service options, change in available options, the language of the user, etc. It is even possible that this additional functionality could be used as a premium service, for which the user must pay an additional fee, in which case the clips could be downloaded on payment of that fee.

In addition to the signal sent to output 24, battery monitor 22 sends a further signal to transmitter 18, for relay to mobile switching center 14, to inform mobile switching center 14 of the status of battery 20.

Mobile switching center 14 is part of a larger communications network, not otherwise shown, which establishes communications between cellular telephone 12 (which has a first address on the network) and a second telephone 26 (which has a second address on the network). Second telephone 26 may be either a land line or a second mobile telephone. Second telephone 26 also has a receiver 28 and a transmitter 30.

In known fashion, mobile switching center 14 establishes a communications channel between cellular telephone 12 and second telephone 26, and, in the usual course, maintains that connection until one of the telephones 12 and 26 transmits a signal indicating that the user thereof wishes to break the connection.

Under known procedures, when battery 20 of cellular telephone 12 has insufficient power to maintain the connection, the signal output by transmitter 18 thereof simply stops. Mobile switching center 14 interprets this condition as a disconnect, and terminates the connection with second telephone 26. Similarly, if cellular telephone 12 passes beyond the service area of mobile switching center 14 (including any adjacent area of coverage) or through a location where no coverage exists (e.g., in a tunnel) the loss of signal is interpreted as a disconnect, and mobile switching center 14 re-allocates the resources allocated for the connection. In these cases, the user of second telephone 26 does not immediately know that the connection has been broken.

However, according to the present invention, another option exists.

Mobile switching center 14 is also capable of handing over the communication with second telephone 26 to a third, transfer, address 32 on the network through a switch 34. Transfer address 32 may represent any form of communication device, such as a telephone, either cellular or land-based, or a voice messaging center, as will be discussed below. Mobile switching center 14 may also include an announcing means, such as a voice playback generator 42, to report the status of the attempted re-routing of the communication to telephone 26.

Transfer address 32 may include a hierarchy of different addresses selected by the user of cellular telephone 12, depending upon the desired results. For example, a first option would be to attempt to re-connect with cellular telephone 12 after a predetermined period of time to allow for a change in battery 20. Mobile switching center 14 may periodically "poll" cellular telephone 12 to re-connect automatically. If the connection is not re-established within a prescribed period, then other options may be explored. Alternatively, cellular telephone 12 could be programmed to call mobile switching center 14 when power is restored, or the user is otherwise able to re-connect to the network. A second option for transfer may be to another telephone 36 to which the user of cellular telephone 12 has immediate access. A third option may be connection to a voice messaging center 38 where a voice mail message may be left. A fourth address 40 may be connection to a "live person", such as a secretary with whom a conversation may be held or an interactive message may be left. The user of mobile phone 12, knowing the hierarchy of transfer addresses, will know exactly where to find a message from the user of telephone 26.

In one embodiment of the invention, one of the hierarchical addresses may be selected depending upon the nature of the user of cellular telephone 12, and the transfer address may be of someone who belongs to a class of persons to which the user of cellular telephone 12 also belongs. For example, if the user of cellular telephone 12 is a salesman of a particular company, and the user of telephone 26 is a customer, it may be desirable to hand over the call to another salesman of that same company to continue the sales call.

Figure 2:
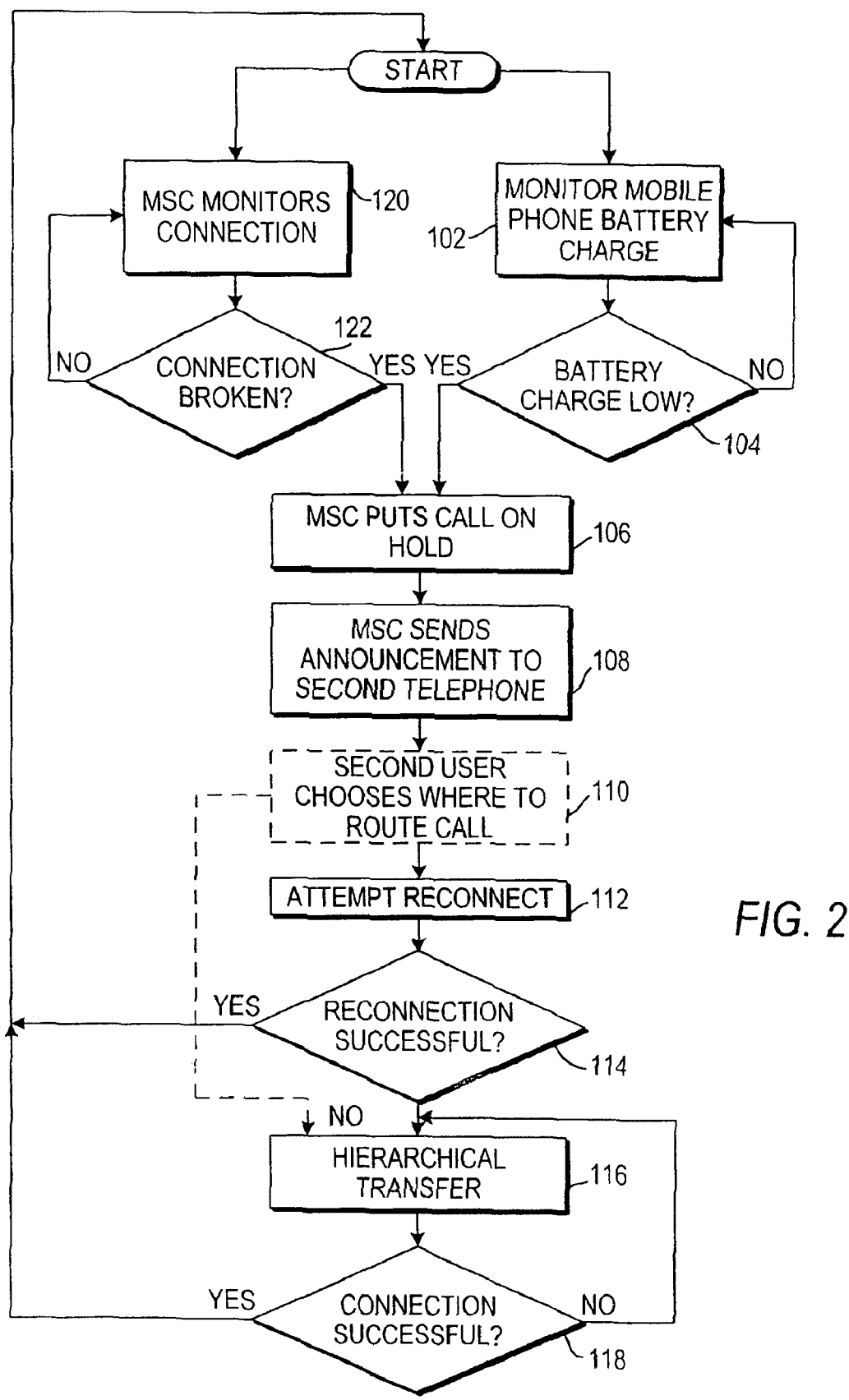
FIG. 2 is a flow chart showing the operation of the embodiment represented in FIG. 1.

The operation of inventive system 10 may be best understood by reference in addition to the flow chart depicted in FIG. 2. The level of power in battery 20 is monitored, step 102, by battery monitor 22. When the battery power reaches a dangerously low level such that continued transmission will fail within a relatively short period of time, that is, fall below a predetermined threshold battery power level, step 104, battery monitor 22 sends a low battery indicator signal to mobile switching center 14. This alerts mobile switching center 14 that the connection is about to be lost, and that mobile switching center 14 must act to retain the connection. Monitor 22 also sends a signal to mobile phone output 24 to alert the user that the battery power is too low and that the communications connection is in imminent danger of being terminated. The first possibility is that the user may have a spare battery, and so mobile switching center 14 automatically places the call on hold, step 106, for a predetermined period of time sufficient to allow the user of cellular telephone 12 to attempt to change battery 20 in cellular telephone 12. Any period of time may be selected such as, for example, about 15 seconds.

If the call is placed on hold for this long, it is necessary to inform the user of telephone 26 of the fact the call has been placed on hold. Accordingly, in addition to or instead of the signal being sent by the mobile phone's monitor 22 to output 24, mobile switching center 14 triggers announcement means 42 to issue an announcement to telephone 26 (and possibly also mobile phone 12), that the call has been placed on hold, step 108, and an attempt will be made to re-establish the connection in a stated period of time. If it is re-established, then the system reverts to its initial state, with battery monitor 22 monitoring the level of power in battery 20.

Optionally, the invention may provide for the user of telephone 26 to be given a choice of whether he wishes to be kept on hold, or immediately transferred to transfer address 32, step 110. This option may be exercised in any convenient fashion, such as by a voice mail menu, which may be responsive to voice selection or the pushing of buttons on phone 26. The option may even give the user of second telephone 26 a choice of which address in the hierarchy he wishes to use.

Switch 34 will then follow the direction given, and hand over, step 112, the call to the selected hierarchical address 36, 38 or 40. Mobile switching center 14 will then attempt to re-establish a connection, and check to ensure it is made, step 114. If the connection is successfully established, then the system returns to its initial condition, steps 102, 120. If not, successive attempts to re-connect are made, steps 116, 118, until a successful transfer is made. Upon establishment of a new connection, the system returns to its initial condition, steps 102, 120.

In like fashion, mobile switching center 14 may monitor the status of the connection between cellular telephone 12 and second telephone 26, step 120, so that if the connection is broken without an affirmative disconnect being generated by either telephone such as when the user of mobile phone 12 moves out of the mobile network or enters a tunnel, step 122, then mobile switching center 14 will presume that the call was intended to be continued. If this is the case, mobile switching center 14 will attempt to follow the above-described protocol, and attempt either to re-connect the two telephones, or to transfer the connection with second telephone 26 to a transfer address, automatically.

In this fashion, satisfaction with the overall performance of the cellular telephone experience may be enjoyed, since fewer conversations will be left dangling as a result of unwanted breaks in telephone connections, either as a result of battery failure or other types of unwanted disconnects.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for handing over a mobile wireless connection established over a network, said mobile wireless connection being between a mobile terminal having a first address on said network and a terminal having a second address on said network, said mobile wireless connection being established through a switching center, said mobile terminal having a battery, said method comprising:

monitoring a level of power of said battery;

sending a handover request to said switching center when said level of power of said battery falls below a predetermined level to re-route said mobile wireless connection from said first address to a transfer address on said network through said switching center; and establishing a transfer connection between said second address and said transfer address.

2. The method of claim 1, further comprising the steps of:

monitoring said connection to recognize a disconnect of said mobile wireless connection not resulting from a disconnect signal generated by either said mobile terminal or said terminal;

sending a handover request to said switching center when said disconnect not resulting from a disconnect signal is recognized; and establishing a transfer connection between said second address and said transfer address when said disconnect not resulting from a disconnect signal is recognized.

3. The method of claim 1, further comprising the steps of:

monitoring said connection to recognize a break in said mobile wireless connections;

sending a handover request to said switching center when said break is recognized; and establishing a transfer connection between said second address and said transfer address when said break is recognized.

4. The method of claim 3, further comprising the steps of:

placing said mobile wireless connection on hold; and attempting to re-establish said mobile wireless connection when said break no longer exists.

5. The method of claim 3, further comprising the step of:

informing said second user that said mobile wireless connection is being re-routed.

6. The method of claim 5, wherein said step of informing said second user that said mobile wireless connection is being re-routed includes offering said second user a choice of transfer addresses to which said second user may be re-routed.

7. The method of claim 1, further comprising the steps of:

placing said mobile wireless connection on hold; and attempting to re-establish said mobile wireless connection between said first address and said second address after a predetermined period of time has elapsed from the time said mobile wireless connection has been re-routed, said transfer address being said first address.

8. The method of claim 7, wherein said predetermined period of time is sufficient to allow said battery of said mobile terminal to be changed.

9. The method of claim 7, further comprising, if said mobile wireless connection between said first address and said second address cannot be re-established, re-routing said mobile wireless connection to a second transfer address, said second transfer address being other than said first address.

10. The method of claim 7, wherein said predetermined period of time is at least 15 seconds.

11. The method of claim 1, wherein said transfer address includes a hierarchy of alternate network addresses.

12. The method of claim 11, wherein a first alternate network address in said hierarchy is said first address.

13. The method of claim 12, wherein a second alternate network address in said hierarchy is an address having an alternate first user address for voice communication, so that said connection may be continued at said second alternate network address.

14. The method of claim 13, wherein a third alternate network address in said hierarchy is an address at which said second user may leave a message.

15. The method of claim 11, wherein a first alternate network address in said hierarchy is an address at which said second user may leave a message.

16. The method of claim 11, wherein a first alternate network address in said hierarchy is an address at which said second user may reach a third party.

17. The method of claim 16, wherein said first address corresponds to a person in a specific class of user, and said third party is a person in said specific class of user.

18. A system for handing over a mobile wireless connection established over a network, said mobile wireless connection being between a mobile terminal having a first address on said network and a terminal having a second address on said network, said mobile wireless connection being established through a switching center, said mobile terminal having a battery, said system comprising:

means for monitoring power level of said battery;

means for sending a handover request to said switching center when said means for monitoring determines that said power level of said battery has fallen below a predetermined level; and means for re-routing said wireless mobile connection from said first address to a transfer address on said network through said switching center in response to said handover request to establish a transfer connection between said second address and said transfer address.

19. The system of claim 18, further comprising:

means for monitoring said mobile wireless connection for a disconnect of said mobile wireless connection not resulting from a disconnect signal generated by either said mobile terminal or said terminal;

wherein said means for sending a handover request includes means for sending a handover request to said switching center when said means for monitoring said mobile wireless connection recognizes a disconnect of said mobile wireless connection not resulting from a disconnect signal generated by either said mobile terminal or said terminal.

20. The system of claim 18, further comprising means for monitoring said mobile wireless connection for a break in said mobile wireless connection not resulting from a disconnect signal generated by either said mobile terminal or said terminal.

21. The system of claim 20, further comprising:

means for informing said second user that said mobile wireless connection is being re-routed.

22. The system of claim 21, wherein said means for informing said second user that said mobile wireless connection is being re-routed includes means for offering said second user a choice of transfer addresses to which said second user maybe re-routed.

23. The system of claim 18, further comprising:

means for placing said mobile wireless connection on hold; and means for attempting to re-establish said mobile wireless connection between said first address and said second address after a predetermined period of time has elapsed from the time said handover request has been sent, said transfer address being said first address.

24. The system of claim 23, wherein said predetermined period of time is sufficient to allow said battery of said mobile terminal to be changed.

25. The system of claim 23, further comprising, means for re-routing said mobile wireless connection to a second transfer address, if said mobile wireless connection between said first address and said second address cannot be re-established, said second transfer address being other than said first address.

26. The system of claim 23, wherein said predetermined period of time is at least 15 seconds.

27. The system of claim 18, further comprising:

means for placing said mobile wireless connection on hold; and means for attempting to re-establish said mobile wireless connection when said level of said battery is no longer below said predetermined level.

28. The system of claim 18, wherein said transfer address includes a hierarchy of alternate network addresses.

29. The system of claim 28, wherein a first alternate network address in said hierarchy is said first address.

30. The system of claim 29, wherein a second alternate network address in said hierarchy is an address having an alternate first user address for voice communication, so that said connection may be continued at said second alternate network address.

31. The system of claim 30, wherein a third alternate address in said hierarchy is an address at which said second user may leave a message.

32. The system of claim 28, wherein a first alternate network address in said hierarchy is an address at which said second user may leave a message.

33. The system of claim 28, wherein a first alternate network address in said hierarchy is an address at which said second user may reach a third party.

34. The system of claim 33, wherein said first address corresponds to a person in a specific class of user, and said third party is a person also in said specific class.

35. The system of claim 18, wherein said means for monitoring is located in said switching center.

* * * * *